United States Patent
Göbelt et al.

(10) Patent No.: US 10,301,486 B2
(45) Date of Patent: May 28, 2019

(54) EPOXY/AMINE ADDUCTS FOR DISPERSING SOLIDS

(71) Applicant: BYK-Chemie, GmbH, Wesel (DE)

(72) Inventors: Bernd Göbelt, Wesel (DE); Jürgen Omeis, Dorsten-Lembeck (DE); Andreas Okkel, Wesel (DE); Marcus Meichsner, Kamp-Lintfort (DE); Astrid Rudolfi, Krefeld (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 15/516,187

(22) PCT Filed: Oct. 13, 2015

(86) PCT No.: PCT/EP2015/073705
§ 371 (c)(1),
(2) Date: Mar. 31, 2017

(87) PCT Pub. No.: WO2016/059066
PCT Pub. Date: Apr. 21, 2016

(65) Prior Publication Data
US 2017/0292030 A1    Oct. 12, 2017

(30) Foreign Application Priority Data

Oct. 14, 2014 (EP) .................................... 14188894

(51) Int. Cl.
| | |
|---|---|
| C08G 59/20 | (2006.01) |
| C09D 7/65 | (2018.01) |
| C08G 59/18 | (2006.01) |
| C08G 59/50 | (2006.01) |
| C08G 65/26 | (2006.01) |
| C08L 63/00 | (2006.01) |
| C09D 11/037 | (2014.01) |
| C09D 11/102 | (2014.01) |

(52) U.S. Cl.
CPC ............. *C09D 7/65* (2018.01); *C08G 59/184* (2013.01); *C08G 59/50* (2013.01); *C08G 65/2624* (2013.01); *C08L 63/00* (2013.01); *C09D 11/037* (2013.01); *C09D 11/102* (2013.01)

(58) Field of Classification Search
CPC .. C08G 59/184; C08G 18/283; C08G 18/643; C08G 18/8064
USPC ................... 528/85, 119, 120, 121; 428/407
See application file for complete search history.

(56) References Cited

U.S. PATENT DOCUMENTS 5,128,393 A * 7/1992 Peng .................. C08G 59/5073
523/402
7,312,260 B2  12/2007 Krappe et al.
(Continued)

FOREIGN PATENT DOCUMENTS

| EP | 1 486 524 A1 | 12/2004 |
|---|---|---|
| EP | 1 745 104 A1 | 1/2007 |

(Continued)

OTHER PUBLICATIONS

PCT/EP2015/073705—International Search Report, dated Oct. 14, 2014. English Translation. PCT/EP2015/073705—International Written Opinion, dated Oct. 14, 2014. English Translation.
PCT/EP2015/073705—International Preliminary Report on Patentability, dated Apr. 18, 2017. English Translation.

* cited by examiner

*Primary Examiner* — Hoa (Holly) Le
(74) *Attorney, Agent, or Firm* — Curatolo Sidoti Co., LPA; Joseph G. Curatolo; Vincent A. Cortese

(57) ABSTRACT

The invention relates to comb copolymers, which can be produced from at least one diglycidyl ether (A) of general formula (I), at least one polyether monoamine (B) of the general formula $R^t$—$[OEt]_n[OPr]_m[OBu]_s$—$NH_2$, at least one amine (C) of the general formula Z—$R^1$—$NH_2$, and optionally at least one secondary amine (D) that is free of primary amino groups and is of the general formula NHTV, wherein R stands for a residue free of epoxy groups, selected from aliphatic residues, aromatic residues, and araliphatic residues; $R^t$ stands for a residue selected from alkyl residues having 1 to 6 carbon atoms; OEt stands for an ethylene oxide residue, OPr stands for a propylene oxide residue, and OBu stands for a butylene oxide residue; n stands for a number from 0 to 100, m stands for a number from 3 to 50, and s stands for a number from 0 to 20, and n+m+s=3 to 103; $R^1$ stands for an aliphatic, aromatic, or araliphatic hydrocarbon residue having 1 to 12 carbon atoms; Z stands for a residue free of primary and secondary amino groups and having at least one basic nitrogen atom, T and V do not contain any secondary amino groups and stand, independently of each other, for aliphatic residues having 1 to 12 carbon atoms, aromatic residues having 6 to 12 carbon atoms, or araliphatic residues having 7 to 12 carbon atoms, wherein the molar number of the sum of the primary amino groups of the polyether monoamines (B) and primary amino groups of the amines (C) divided by the molar number of the epoxy groups of the diglycidyl ethers (A) equals a value of ⅓ to ¾. The invention further relates to the production of the comb copolymers, dispersions, particulate preparations, wetting agents, and dispersants that contain the comb copolymers, to particles coated with the comb copolymers, and to the use of the comb copolymers as wetting agents and dispersants, in particular for increasing the jetness.

12 Claims, No Drawings

(56) References Cited

U.S. PATENT DOCUMENTS

| | | |
|---|---|---|
| 8,653,222 B2 | 2/2014 | Orth et al. |
| 9,217,083 B2 | 12/2015 | Hans et al. |
| 9,340,641 B2 | 5/2016 | Orth et al. |
| 2008/0011961 A1* | 1/2008 | Shoji ............... C09K 11/616 250/370.11 |
| 2013/0018126 A1* | 1/2013 | Orth ............... C08G 18/283 523/400 |

FOREIGN PATENT DOCUMENTS

| | | |
|---|---|---|
| WO | WO 2005/113677 A1 | 12/2005 |
| WO | WO 2008/092687 A1 | 8/2008 |
| WO | WO 2011/070074 A1 | 6/2011 |
| WO | WO 2012/049186 A1 | 4/2012 |

(56) References Cited

FOREIGN PATENT DOCUMENTS

EPOXY/AMINE ADDUCTS FOR DISPERSING SOLIDS

CROSS REFERENCE TO RELATED APPLICATIONS

This application is a national stage application of International Application No. PCT/EP2015/073705, filed 13 Oct. 2015, which claims priority from European Patent Application No. 14188894.1, filed 14 Oct. 2014, which applications are incorporated herein by reference.

The present invention relates to an epoxy/amine-based copolymer suitable as a wetting agent and dispersant, to the preparation thereof, to dispersions and pigment preparations containing the copolymer, and to the use of the copolymer as a wetting agent and dispersant.

Epoxy/amine-based adducts usable as wetting agents and dispersants are already known from several patent specifications.

For instance, EP 1 486 524 A1 describes the preparation of epoxy adducts and salts thereof for use as dispersants. More particularly described are epoxy/amine adducts obtainable by the reaction of mono- or polyfunctional aromatic epoxides with polyoxy-alkylenemonoamines of a number-average molecular weight of more than 400 g/mol. The conversion level of the epoxy groups should be 90% to 100% and the proportion by weight of the addition compounds onto aromatic groups should be not more than 50% by weight. There is no description of incorporation of diamines having a primary and tertiary amino group or a basic heterocyclic group in the preparation of the dispersants in EP 1 486 524 A1.

EP 1 745 104 A1 discloses comb-type polyether alkanolamines as dispersants for inks and printing inks. As in EP 1 486 524 A1, these are by reaction of mono-functionally amine-terminated polyethers with aliphatic polyglycidyl ethers.

WO 2012/049186 describes comb copolymers based on epoxy/amine adducts which necessarily have polysiloxane side chains. Although it is additionally also possible to use polysiloxane-free amines in the preparation of these comb copolymers, including monoamine-functional polyoxyalkyleneamines or else diamines bearing tertiary and primary amino groups, the use thereof is not obligatory, nor is there any disclosure of the use thereof in a mixture with one another.

WO 2008/092687 A1 discloses wetting agents and dispersants based on isocyanate monoadducts. These are obtained by reaction of a polyepoxide with an aliphatic or araliphatic primary amine which may additionally bear functional groups and subsequent reaction with a monoisocyanate bearing polyether groups.

WO 2011/070074 A1 describes comb copolymers obtainable by the reaction of diglycidyl ethers with polyoxyalkylenemonoamines bearing primary amine groups and aliphatic or araliphatic primary amines which may also bear tertiary amino groups. These precursors are reacted with monoisocyanates bearing ester and/or ether groups, in order to obtain the wetting agents and dispersants described as target compounds in WO 2011/070074 A1. The precursors described in WO 2011/070074 are similar to the wetting agents and dispersants described in the present invention in relation to the starting materials used, but not with regard to the ratios of primary amino groups to epoxy groups in the starting compounds that are required for preparation of the wetting agents and dispersants of the present invention.

However, what is common to the above-described wetting agents and dispersants is that they are inadequate, specifically in the case of finely divided carbon black pigments, for achievement of a marked jetness effect (corresponding to a very intense black color). Although the color depth increases through decreasing brightness alone in the case of black-pigmented systems, tinting also has an effect on visual assessment of the color depth of black colorations. To the standard observer, a blue tint subjectively increases the color depth effect of a black coloration, whereas a brown tint with the same brightness subjectively reduces the color depth effect. However, the prior art wetting agents and dispersants still do not give optimal results with regard to the visual color depth effect of black-pigmented systems. It is only particularly good stabilization of the primary particles of carbon black pigments in particular that allows optimization of the blue tint. There is thus a need for wetting agents and dispersants which lead to excellent stabilization of the pigment dispersions even in the case of particularly difficult dispersion tasks.

The wetting agents and dispersants should be usable both in aqueous and in solvent-based systems, and generally contribute to excellent dispersion of particulate solids. This is also manifested, for example, in a minimum initial viscosity of the systems after incorporation of the particulate solids using the wetting agents and dispersants, and good long-term stability of the systems.

Paints containing particulate solids should additionally also have high gloss and feature very high transparency.

It is thus an object of the present invention to provide a high-quality wetting agent and dispersant having particularly good properties with regard to the stabilization of dispersions containing particles, especially dispersions containing finely divided carbon black pigments, for achievement of an excellent jetness effect.

This object is surprisingly achieved through the provision of a comb copolymer preparable from at least one diglycidyl ether (A) of the general formula (I)

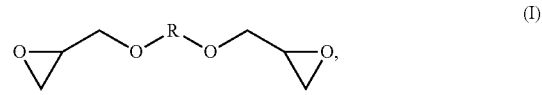

at least one polyether monoamine (B) of the general formula (II)

$$R'\text{—}[OEt]_n[OPr]_m[OBu]_s\text{—}NH_2 \qquad (II),$$

at least one amine (C) of the general formula (III)

$$Z\text{—}R^1\text{—}NH_2 \qquad (III),$$

and optionally at least one secondary amine (D) which is free of primary amino groups and is of the general formula (IV)

$$NHTV \qquad (IV)$$

where

R is a radical free of epoxy groups, selected from aliphatic radicals, aromatic radicals and araliphatic radicals, $R'$ is a radical selected from alkyl radicals having 1 to 6 carbon atoms,

(56) References Cited

FOREIGN PATENT DOCUMENTS

OEt is an ethylene oxide radical, OPr is a propylene oxide radical and OBu is a butylene oxide radical, n is a number from 0 to 100, m is a number from 3 to 50 and s is a number from 0 to 20 and n+m+s=3 to 103, $R^1$ is an aliphatic, aromatic or araliphatic hydrocarbyl radical having 1 to 12 carbon atoms, Z is a radical which is free of primary and secondary amino groups and has at least one basic nitrogen atom, T and V do not contain any secondary amino groups and are independently aliphatic radicals having 1 to 12 carbon atoms, aromatic radicals having 6 to 12 carbon atoms or araliphatic radicals having 7 to 12 carbon atoms, characterized in that the molar number of the sum total of the primary amino groups of the polyether monoamines (B) and primary amino groups of the amines (C), divided by the molar number of epoxy groups of the diglycidyl ethers (A), gives a value of ⅓ to ¾.

The above comb copolymers are also referred to herein as comb copolymers of the invention. The comb copolymers obtained by salt conversion, quaternization and/or amidation of the aforementioned comb copolymers are also included here among the comb copolymers of the invention. All figures of concentration and amount used hereinafter in relation to comb copolymers of the invention therefore relate to the totality of the comb copolymers of the invention, irrespective of whether they are salt conversion, quaternization and/or amidation products, as described more particularly further down, or whether none of these further modifying reactions has been effected.

Diglycidyl ether (A)

The diglycidyl ether (A) of the general formula (I)

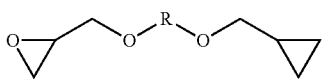

(I)

may have an aliphatic radical as the R radical. The term "aliphatic" here encompasses cyclic and acyclic, saturated or unsaturated organic radicals, except for aromatic radicals. The R radical here may contain heteroatoms, for example and in particular oxygen atoms and/or sulfur atoms.

If the R radical is an acyclic aliphatic radical, R is preferably a hydrocarbyl radical, especially an alkylene radical having 2 to 10, preferably 4 to 8 and more preferably 4 to 6 carbon atoms, or is an alkylene oxide radical comprising preferably 1 to 100, preferably 1 to 20, alkylene oxide units which are preferably selected from ethylene oxide, propylene oxide and butylene oxide units, among which preference is given to ethylene oxide and propylene oxide units. If more than one alkylene oxide unit is present in the alkylene oxide radical, this is called a polyalkylene oxide radical. Polyalkylene oxide radicals therefore contain preferably 2 to 100 and more preferably 2 to 20 alkylene oxide units.

If the R radical is a cyclic aliphatic radical, this may be a hydrogenated aromatic or hydrogenated araliphatic radical. In principle, all aromatic and araliphatic radicals are amenable to hydrogenation, especially those described further down.

The diglycidyl ether (A) of the general formula (I) may have an araliphatic radical as the R radical. The term "araliphatic" encompasses those R radicals which contain both aromatic groups and aliphatic groups. If the R radical is an araliphatic radical, R is preferably a -Ph-$CR^4_2$-Ph- radical where the two $R^4$ radicals are independently hydrogen or an alkyl group having 1 to 4 carbon atoms, or are a -Ph-$SO_2$-Ph- radical (in the latter case, the diglycidyl ether of the formula (I) is bisphenol S diglycidyl ether). Preferably, both $R^4$ radicals are a methyl group or hydrogen. If both $R^4$ radicals are a methyl group, the R radical is a radical derived from bisphenol A radical and the compound of the formula (I) is bisphenol A diglycidyl ether. If both $R^4$ radicals are hydrogen, the R radical is a radical derived from bisphenol F radical and the compound of the formula (I) is bisphenol F diglycidyl ether.

The diglycidyl ether (A) of the general formula (I) may also contain, as the R radical, an araliphatic radical -Ph-$CR^4_2$-Ph-[O—$CH_2$CH(OH)$CH_2$—O-Ph-$CR^4_2$-Ph]$_p$- with p=1 to 15, preferably p=1 to 9, where $R^4$ is as defined above. In that case, reference is made to (solid) epoxy resins or phenoxy resins.

The totality of the diglycidyl ethers (A) is also referred to herein as component (A).

Polyether monoamines (B)

The polyether monoamine (B) of the general formula (II)

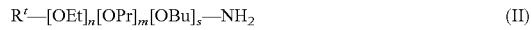

(II)

has, as the $R^t$ radical, preferably an alkyl radical having 1 to 4 carbon atoms, more preferably $R^t$=methyl.

The n [OEt], m [OPr] and s [OBu] units may be arranged in any sequence. This especially includes a random sequence or arrangement in the form of [OEt], [OPr] and/or [OBu] blocks or an arrangement in the form of a gradient, for example an enrichment or depletion of [OEt] or the other alkoxy units along the polyalkylene oxide chain.

Preferably, n>m>s. More preferably, s=0.

More preferably, s=0 and the ratio of n/m>1, better>2 and even better>3, for example 3 to 50.

Preferably, n is a number from 5 to 75, m is a number from 3 to 40 and s is a number from 0 to 10. Most preferably, the sum of n+m+s=8 to 80.

The totality of the polyether monoamines (B) is also referred to herein as component (B).

Amines (C)

The amines (C) of the formula (III) Z—$R^1$—$NH_2$ contain, as well as a primary amino group, a Z radical which is free of primary and secondary amino groups and which contains at least one basic nitrogen atom. A basic nitrogen atom is one which has a free electron pair and can thus accept a proton from an acid. The Z radical is preferably a monomeric radical.

The $R^1$ radical is preferably an araliphatic radical having 1 to 12 carbon atoms, more preferably 1 to 6 carbon atoms, most preferably 1 to 4 carbon atoms. More preferably, the aliphatic $R^1$ radicals are hydrocarbyl radicals having 1 to 12, preferably 1 to 6 and more preferably 1 to 4 carbon atoms. Examples of particularly preferred $R^1$ radicals are $CH_2$, $CH_2$—$CH_2$ and $CH_2$—$CH_2$—$CH_2$.

Z is preferably $NR^2R^3$ in which $R^2$ and $R^3$ are independently aliphatic radicals having 1 to 12, more preferably 1 to 4 and most preferably 1 or 2 carbon atoms. More preferably, the $R^2$ and $R^3$ radicals are independently alkyl groups having 1 to 6, preferably 1 to 4 and more preferably 1 or 2 carbon atoms. Examples of particularly preferred Z radicals are $N(CH_3)_2$ and $N(CH_2CH_3)_2$.

The Z radical which is free of primary and secondary amino groups may also be a heterocyclic radical containing at least one basic nitrogen atom. Preferably, the heterocyclic radical is a 5-membered or 6-membered heterocyclic radical. Examples of particularly preferred heterocyclic Z radicals are pyridyl and imidazolyl radicals.

Examples of particularly preferred amines (C) are N,N-dimethylaminoethylamine, N,N-dimethylaminopropylamine, N,N-diethylaminoethylamine, N, N-diethylaminopropyl-amine, 2-aminomethylpyridine, 4-aminomethylpyridine and N-aminopropylimidazole.

The totality of the amines (C) is also referred to herein as component (C).

Secondary amines (D) Free of Primary Amino Groups

The use of the secondary amines (D) which are free of primary amino groups and are of the formula (IV) NHTV is optional. However, the use thereof makes it possible to better control the chain length of the comb copolymers of the invention, since they act as what are called chain terminators.

The T and V radicals do not contain any secondary amino groups and are independently aliphatic radicals having 1 to 12 carbon atoms, aromatic radicals having 6 to 12 carbon atoms or araliphatic radicals having 7 to 12 carbon atoms. The T and V radicals may be hydrocarbyl radicals, i.e. free of heteroatoms. However, the T and V radicals may also be hydroxyl groups or be Z—$R^1$ radicals as defined under formula (III).

Examples of suitable secondary amines (D) are dialkylamines, for example dimethylamine, diethylamine, dibutylamine, di(2-ethylhexyl)amine; diaralkylamines such as dibenzylamine; N-aralkyl-N-alkylamines such as N-benzyl-N-methylamine; di(hydroxyalkyl)amines such as diethanolamine and diisopropanolamine; bis(dialkyl-aminoalkyl)amines, for example bis(dimethylamino-propyl)amine (Jeffcat Z-130); N-alkyl-N-hydroxyalkyl-amines such as butylethanolamine and ethylethanolamine; N-dialkylamino-alkyl-N-alkylamines such as N-dimethyl-aminopropyl-N-methylamine.

The totality of the secondary amines (D) free of primary amino groups is also referred to herein as component (D).

Preferred Comb Copolymers of the Invention

Preferably, the comb copolymers of the invention have a structure of the general formula (V)

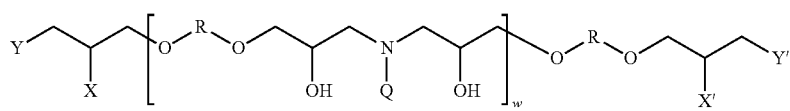

(V)

in which the w+1 R radicals may be selected independently of one another and are as defined in the general formula (I), one of the Y and X radicals is OH and the other radical is NHQ or NTV, one of the Y' and X' radicals is OH and the other radical is NHQ or NTV, and Q radicals are independently $Q^1=R^t$—[OEt]$_n$[OPr]$_m$[OBu]$_s$ or $Q^2=Z$—$R^1$, in which $R^t$, OEt, OPr, OBu, n, m and s are as defined in formula (II) and Z and $R^1$ are as defined in formula (III), T and V are as defined in formula (IV), and w is a number from 1 to 20, preferably 2 to 15, more preferably 2 to 10 or 3 to 10, with the proviso that the formula (V) contains at least one $Q^1$ radical and at least one $Q^2$ radical.

A good explanation of the term "comb copolymer" as used in the present invention is possible with reference to the above structure of the formula (V). The epoxy/amine backbone here forms the spine of the comb, with the Q and any T and V radicals bonded to the nitrogen atoms of the backbone constituting the teeth of the comb. In the simplest case (w=1), the comb has two terminal teeth and one tooth along the spine of the comb, i.e. along the epoxy/amine backbone.

It is apparent from the above formula (V) that, for the shortest conceivable main chain, i.e. for w=1, the molecule is formed using exactly two diglycidyl ethers (A), i.e. a total of 4 epoxy groups are converted to form such a molecule of the formula (V). With the proviso that at least one $Q^1$ radical and at least one $Q^2$ radical must be present, these being incorporated via the primary amines (B) and (C), it is apparent that, for the 4 epoxy groups, there must be at least 2 primary amino groups that are reacted therewith. The molar number of the sum total of the primary amino groups of the polyether monoamines (B) and primary amino groups of the amines (C) used, divided by the molar number of epoxy groups of the diglycidyl ethers (A), in that case is exactly 0.50. In such a case, exactly one of the two terminal radicals is an NTV radical. If there is no NTV radical, there is an NHQ radical in its place, in which Q is $Q^1$ or $Q^2$. In that case, however, there are 3 primary amino groups for 4 epoxy groups. The molar number of the sum total of the primary amino groups of the polyether monoamines (B) and primary amino groups of the amines (C) used, divided by the molar number of the epoxy groups of the diglycidyl ethers (A), in this case is exactly 0.75. When w=2, for two terminal NTV radicals, it is apparent that exactly one $Q^1$ radical and one $Q^2$ radical will be present and six epoxy groups will react; this marks the absolute lower limit for the molar number of the sum total of the primary amino groups of the polyether monoamines (B) and primary amino groups of the amines (C) used, divided by the molar number of the epoxy groups of the diglycidyl ethers (A), which is (or 0.33).

In a preferred variant, not more than one mole of component (D) is used per mole of component (C). More preferably, not more than one mole of component (D) is used per 3 mol of component (C). Most preferably, the comb copolymers of the invention are prepared exclusively from components (A), (B) and (C). For the latter very particularly preferred case, the molar number of the sum total of the primary amino groups of the polyether monoamines (B) and primary amino groups of the amines (C) used, divided by the molar number of the epoxy groups of the diglycidyl ethers (A), is always greater than 0.5.

Salt Conversion and Quaternization Products of the Comb Copolymers of the Invention The amino groups in the comb copolymers of the invention, especially the tertiary and secondary amino groups in

(56) References Cited

FOREIGN PATENT DOCUMENTS the comb copolymers of the invention, can be reacted with acids to give ammonium salts and, for example, with alkylating agents or aralkylating agents to give quaternary ammonium compounds. Therefore, the present invention further provides salts and quaternization products of the comb copolymers of the invention.

For conversion of the comb copolymers of the invention to salts, it is possible to use organic or inorganic acids and acidic partial esters of the organic and inorganic acids. Preferred examples are carboxylic acids, sulfonic acids and acidic phosphoric esters, for example the mono- and diesters thereof.

For quaternization of the comb copolymers of the invention, it is possible to use all customary quaternizing agents, for example alkylating agents. Examples of suitable alkylating agents are alkyl and aralkyl halides and sulfates, such as benzyl chloride, methyl iodide or dimethyl sulfate. Combinations of monooxiranes and acids are also suitable as alkylating agents or aralkylating agents, by means of which hydroxylated alkyl groups or hydroxylated aralkyl groups are introduced. Examples of oxiranes in this connection are ethylene oxide, propylene, oxide, butylene oxide, styrene oxide and glycidyl ethers such as ethylhexyl glycidyl ether, phenyl glycidyl ether and cresyl glycidyl ether.

Amidation Products of the Comb Copolymers of the Invention

If the comb copolymers of the invention have at least one terminal NHQ radical, it is possible, for example, for lactones such as propiolactone, valerolactone, butyrolactone, caprolactone and/or alkylated lactones, especially those bearing methyl groups, to react with the NHQ radical by ring opening to form an amide group. The addition of a lactone molecule is conducted by methods known to those skilled in the art at temperatures of about 70° C. to 180° C. Particularly preferred lactones are ε-caprolactone and δ-valerolactone. The addition of two or more lactone molecules onto one another by ring-opening polymerization is undesirable.

Synthesis of the Comb Copolymers of the Invention

The present invention also further provides a process for preparing the comb copolymers of the invention.

The diglycidyl ether(s) (A) is/are reacted with the polyether monoamine(s) (B), the amine(s) (C) and optionally the secondary amine(s) (D) at temperatures between 25° C. and 300° C., preferably between 80° C. and 200° C. and most preferably between 100° C. and 150° C. In this case, either all components (A), (B), (C) and optionally (D) are initially charged and heated to the reaction temperature, or component (A) is initially charged and the amine components (B), (C) and optionally (D) are added as a mixture or sequentially or metered in over a period of time. In a preferred embodiment, component (D) is metered in last, in order to trigger chain termination. Compared to reactions in which only components (A) and (B) are reacted, the use of component (C) and, if used, component (D) as co-reactants, in terms of process technology, has the positive additional effect that the reaction time until complete conversion (epoxy equivalent is infinite) is shortened and hence production costs can be reduced.

It should be ensured here that the molar ratio of all primary amino groups of components (B) and (C), i.e. of the polyether monoamines (B) and the amines (C), to the epoxy groups of component (A), i.e. the diglycidyl ethers (A), is ⅓ to ¾, preferably 0.50 to 0.70 and more preferably 0.50 to 0.60. If no component (D) is used, the lower limit of this ratio is greater than 0.50.

The molar ratio of component (B) to component (C) can vary within wide ranges. The molar ratio of component (B) to component (C) is preferably 5:1 to 1:5, more preferably 4:1 to 1:1 and most preferably 3:1 to 1.5:1.

Dispersions of the Invention

The invention also relates to dispersions comprising a dispersion medium and at least one type of dispersed particulate solid and at least one comb copolymer of the invention. The solid is preferably an inorganic or organic filler, an inorganic or organic pigment or a form of carbon other than standard fillers and pigments, formally considering the various forms of carbon herein, except for the pigment blacks, to be among the fillers. In the literature, there is likewise no exact delimitation between pigments and fillers. Frequently, however, the refractive index is employed in order to distinguish between pigments and fillers. Typically, pigments have a refractive index of ≥1.7, whereas the refractive index of fillers is typically <1.7. However, a sharp distinction of this kind does not play any crucial role within the context of the invention.

Based on the total weight of the dispersion, the comb copolymers of the invention are preferably used in an amount of 0.1% to 10% by weight, more preferably 0.3% to 4.5% by weight, and most preferably 0.5% to 4% by weight.

Preferably, the dispersion of the invention takes the form of an ink or coating composition, especially of a printing ink or paint.

Use of the Comb Copolymers of the Invention as Wetting Agents and Dispersants

Finally, the invention also relates to the use of the comb copolymer of the invention as a wetting agent and dispersant. The wetting agents and dispersants preferably serve to increase jetness.

The comb copolymer of the invention is especially used in the fields of use known for dispersants. For example in the production or processing of paints, printing inks, paper coating slips, leather and textile dyes, pastes, pigment concentrates, ceramic materials or cosmetic formulations, especially when these products contain particulate solids such as pigments and/or fillers.

It is also possible to use the comb copolymer of the invention in the production or processing of casting and/or molding materials based on synthetic, semisynthetic or natural macromolecular substances such as polyvinyl chloride, saturated or unsaturated polyesters, polyurethanes, polystyrenes, polyacrylates, polyamides, epoxy resins, polyolefins such as polyethylene or polypropylene. For example, corresponding comb copolymers can be used for production of casting materials, PVC plastisols, gel coats, polymer concrete, printed circuit boards, industrial coatings, wood and furniture coatings, motor vehicle coatings, marine paints, anticorrosion paints, can and coil coatings and decorating and masonry paints. Examples of standard main binders in systems of this kind are resins based on polyurethanes, cellulose nitrates, cellulose acetobutyrates, alkyd resins, melamine resins, polyesters, chloro rubbers, epoxy resins and acrylate resins. Examples of water-based coatings are cathodic or anodic electrocoat materials, for example for automobile bodywork. Further examples are renders, silicate paints, emulsion paints, water-based paints based on waterthinnable alkyd resins, alkyd emulsions, hybrid systems, 2-component systems, and polyurethane and acrylate dispersions.

The comb copolymers of the invention are especially also suitable as dispersants for production of solids concentrates, such as pigment concentrates. For this purpose, for example, the comb copolymers are initially charged in a carrier medium, such as organic solvents, plasticizers and/or water, and the solids to be dispersed are added while stirring. In addition, these concentrates may comprise binders and/or other auxiliaries. With the comb copolymers, however, it is especially possible to produce stable binder-free pigment concentrates. It is likewise possible to use the comb copolymers of the invention to produce free-flowing solids concentrates from pigment presscakes. In this case, the comb copolymers are mixed into the presscake which may still contain organic solvents, plasticizers and/or water, and the mixture thus obtained is dispersed. The solids concentrates produced by various routes can then be incorporated into different substrates, for example alkyd resins, polyester resins, acrylate resins, polyurethane resins or epoxy resins.

Particulate solids, but especially pigments and/or fillers, can alternatively be dispersed directly in the comb copolymers without solvent, and are then particularly suitable for pigmentation of thermoplastic and thermoset polymer formulations.

The invention therefore also relates to a particle formulation containing 5.0% to 99.9% by weight of one or more particulate solids and 0.1% to 95.0% by weight of one or more comb copolymers of the invention, based on the total weight of the particle formulation. The particle formulations are preferably pigment formulations or pigment/filler formulations, also referred to as pigment preparations or pigment/filler preparations. The particulate solids, especially the pigments and/or fillers, are typically in a higher concentration in the aforementioned formulations or preparations than in the later applications. In the simplest case, the carrier material used for the particulate solids may be the comb copolymer of the invention, such that, in such a case, the preparations consist to an extent of 5.0% to 99.9% by weight of one or more particulate solids and 0.1% to 95.0% by weight of one or more comb copolymers of the invention. However, the particle formulations may also comprise binders other than the wetting agent and dispersant, including other additives and/or organic solvents and/or water. The particle formulations may be in solid form, for example in the form of powder, chips or granules, or liquid form. In the case of liquid pigment preparations or pigment/filler preparations, depending on the pigment content or pigment and filler content, reference is also made to color concentrates, pigment pastes, full tone pastes, shading or tinting pastes, or pigment pastes.

The particle formulations of the invention, especially the pigment formulations or pigment/filler formulations, are preferably used in the production of paints, printing inks and plastics.

The comb copolymers can advantageously also be used in the production of inks for non-impact printing methods such as thermal inkjet and the bubblejet method. These inks may, for example, be aqueous ink formulations, solvent-based ink formulations, solvent-free or low-solvent inks for UV applications, or else wax-like inks.

The comb copolymers can advantageously also be used in the production of color filters for liquid-crystal displays and screens, color resolution devices, sensors, plasma screens, displays based on SED (Surface conduction Electron emitter Display) and for MLCCs (Multi-Layer Ceramic Capacitors). In this case, the liquid color filter lacquer, which is also referred to as color resist, can be applied by a wide variety of different application methods such as spin-coating, knife-coating, combination of the two methods, or via non-impact printing methods, for example inkjet methods. MLCC methodology is used in the production of microchips and printed circuit boards.

The comb copolymers can also be used for production of cosmetic formulations, for example makeup, face powder, lipsticks, hair colorants, creams, nail varnishes and sunscreen preparations. These may be in the customary forms, for example in the form of W/O or O/W emulsions (water-in-oil or oil-in-water emulsions), solutions, gels, creams, lotions or sprays. The comb copolymers can advantageously be used in dispersions used for production of these formulations. These may comprise the carrier media that are customary for these purposes in cosmetics, such as water, castor oils or silicone oils, and solids, for example organic and inorganic pigments such as titanium dioxide or iron oxide.

Such a dispersant can finally also be used for production of a pigmented coating on a substrate, by applying a pigmented coating composition to the substrate and by baking the pigmented coating composition applied to the substrate or curing or crosslinking it in some other way.

The comb copolymers can be used on their own or together with customary binders. In the case of use in polyolefins, it may be advantageous, for example, to use corresponding low molecular weight polyolefins as carrier materials together with the comb copolymer of the invention.

Another possible use of the comb copolymers of the invention is in the production of dispersible solids in the form of powder particles and/or fiber particles, especially of dispersible pigments or fillers, especially polymeric fillers, the particles having been coated with the comb copolymer of the invention. Such coatings of organic and also inorganic fillers are executed in a known manner. In this case, the solvent or emulsion medium can either be removed or can remain in the mixture with formation of pastes. These pastes are standard commercial products and may additionally contain binder components and also further auxiliaries and additives. Specifically in the case of pigments, the coating of the pigment surface can be effected during or after the synthesis of the pigments, for example by addition of the copolymers to the pigment suspension or during or after the pigment finish. The pigments pretreated in this way feature easier incorporability and improved viscosity, flocculation and gloss characteristics and higher color strength compared to untreated pigments.

Examples of inorganic pigments that are suitable in the context of the present invention are oxide and oxide hydroxide and also complex inorganic pigments, for example titanium dioxide pigments, iron oxide pigments, chromium oxide pigments, bismuth vanadate pigments, complex inorganic chromatic pigments, for example with a rutile or spinel lattice, or oxidic ceramic pigments; sulfide and sulfide selenide pigments, for example zinc sulfide pigments and cadmium pigments; lead chromate pigments, for example chromium yellow pigments, molybdate red pigments and chromium green and chromium fast green pigments; complex salt pigments, for example cyanide pigments (iron

(56) References Cited

FOREIGN PATENT DOCUMENTS blue); silicate pigments, for example ultramarine pigments; effect pigments, for example aluminum, gold bronze and zinc pigments in platelet form, pearlescent pigments, iron oxide-based effect pigments, metal-based effect pigments, color-variable pigments and cholesteric effect pigments; anticorrosion pigments, for example zinc dust, phosphate pigments, zinc oxide/zinc white, iron mica and titanium dioxide-based anticorrosion pigments; and pigment blacks, for example furnace blacks, gas blacks and lamp blacks.

Examples of organic pigments that are suitable in the context of the present invention are azo pigments, for example monoazo pigments, diazo pigments, polyazo pigments and metal complex pigments; polycyclic pigments, for example copper phthalocyanines, diketo-pyrrolopyrroles (DPP), quinacridones, isoindolinones, isoindolines, perylenes and perinones; fluorescent and phosphorescent pigments; and organic black pigments.

Examples of fillers that are suitable in the context of the present invention are silicates, for example natural silicas, for example quartz, cristobalite and fused silica, kieselguhr, talc, kaolin, mica, feldspar and nepheline syenite, Plastorit, pearlites, asbestos, hornblende, wollastonite and siliceous earth; synthetic silicas and silicates, for example fumed silicon dioxide, precipitated silicas, sodium aluminum silicates, calcium silicates, silicas in platelet form, hydrothermal silicas, sheet silicates, silica gels, aerogels, silica sols, for example hydrosols and organosol, and glass; carbonates as fillers, for example natural calcium carbonate products, precipitated calcium carbonate, dolomite, barium carbonate and magnesium carbonate; sulfates, for example barium sulfate, drilling baryte, chemical baryte, filler baryte and Blanc Fixe, calcium sulfate; aluminum oxide and aluminum hydroxide; silicon carbide, fluorspar, slate powder and graphite.

Examples of forms of carbon that are suitable in the context of the present invention, to the extent that they have not already been listed under the term "pigments" or "fillers", are, for example, amorphous carbon, carbon fibers, glassy carbon, graphene, fullerenes, diamonds, lonsdaleite, activated carbon, carbon nanotubes, carbon nanobuds, carbon nanofoam and aerographite.

Further examples of pigments and fillers are to be found, for example, in the "Lehrbuch der Lacke and Beschichtungen" [Paints and Coatings], by Kittel, vol. 5, from the S. Hirzel Verlag, 2003, $2^{nd}$ edition, "Pigmente, Füllstoffe, Farbmetrik" [Pigments, Fillers, Colorimetry].

Aside from that, the comb copolymer of the invention can also be used as an emulsifier and phase mediator (liquid/liquid compatibilizer).

The invention is to be elucidated in detail hereinafter with reference to working examples.

EXAMPLES

Test Methods

Amine Number

The amine number (AN) is understood to mean the amount of KOH in mg corresponding to the amine content of 1 g of substance. The amine number is determined according to DIN 16945 by a neutralization reaction with 0.1 N perchloric acid in acetic acid as titrant:

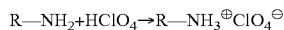

The additions of inert solvents, such as cyclohexane, dioxane, chlorobenzene, acetone, methyl ethyl ketone, can improve the titration of very weak bases.

Epoxy Equivalent

The epoxy equivalent weight is understood to mean that amount of epoxy resin in g containing 16 g of epoxy-bonded oxygen (epoxide oxygen). The epoxy groups in epoxy resins can be determined by addition of HBr onto the epoxide ring. The equivalent amount of HBr is released by titration with $HClO_4$ in the presence of cetyltrimethylammonium bromide (N,N,N-trimethyl-1-hexadecanaminium bromide; CTABr).

Since the amine is simultaneously also protonated in the titration with perchloric acid, this amount of perchloric acid has to be subtracted to calculate the epoxy equivalent. It is therefore necessary to determine the amine number before the determination of the epoxy equivalent.

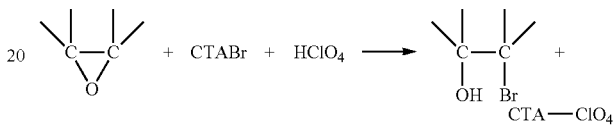

$$\text{Epoxy equivalent} = \frac{\text{starting weight }(g)*100}{(\text{consumption (ml)}*n*f) - (\text{amine number}/56.1)}$$

$n$ = normality of the titrant $f$ = factor of the titrant

Acid Number

The acid number is determined according to DIN EN ISO 2114 by a neutralization reaction with 0.1 N KOH in ethanol as titrant:

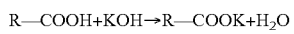

Comparative Examples

Polymer 1

82 g of Epikote 828 (0.07 mol; undiluted difunctional bisphenol A/epichlorohydrin reaction product, manufacturer: Momentive) are reacted with 528 g of Surfonamine L 207 (0.085 mol; methanol-started polyether monoamine with a terminal primary amino group, about 10 OPr and 31 OEt units; amine number=27 mg KOH/g; manufacturer: Huntsman) at 140° C. for 27 h.

Amine number: 19.6 mg KOH/g

Epoxy equivalent: infinite

Polymer 2

82 g of Epikote 828 (0.22 mol) are reacted with 359 g of Surfonamine L 207 (0.177 mol) and 8.6 g of dimethylaminopropylamine (0.08 mol) at 140° C. for 7 h. Subsequently, 145 g of a polyether/tolylene diisocyanate adduct (for preparation see below) are added and the mixture is left to react at 65° C. for a further 5 h.

Amine number: 21.7 mg KOH/g

Epoxy equivalent: infinite

Isocyanate content: 0.05%

Preparation of the Polyether/Tolylene Diisocyanate Adduct

A four-neck flask provided with a stirrer, thermometer, dropping funnel, reflux condenser and nitrogen inlet

(56) References Cited

FOREIGN PATENT DOCUMENTS tube is charged with 43 g of Desmodur T 100 (about 100% tolylene 2,4-diisocyanate, NCO content=48.8) and 0.7 g of benzoyl chloride, which are mixed thoroughly. 200 g of MPEG 2000, which is anhydrous and alkali-free in the case of polyethers, are metered in gradually, such that the temperature does not exceed 55° C. After the metered addition, the mixture is stirred at 55° C. for a further 3 hours. The excess TDI is removed from the reaction mixture by means of a thin-film evaporator at 150° C. The residual TDI content is <1%.

Polymer 3

82 g (0.22 mol) of Epikote 828 are reacted with 323 g of Surfonamine L 207 (0.16 mol), 8.6 g of dimethylaminopropylamine (0.08 mol) and 36 g of polysiloxane monoamine (example 2 from WO 2012/049186) at 140° C. for 7 h.

Amine number: 40.7 mg KOH/g
Epoxy equivalent: infinite

Inventive Examples

Polymer 4

82 g (0.22 mol) of Epikote 828 are reacted with 359 g of Surfonamine L 207 (0.177 mol) and 8.5 g of dimethylaminopropylamine (0.08 mol) at 140° C. for 7 h.

Amine number: 40.9 mg KOH/g
Epoxy equivalent: infinite

Polymer 5

82 g (0.22 mol) of Epikote 828 are reacted with 363 g of Surfonamine L 200 (0.177 mol; methanol-started polyether monoamine with a terminal primary amino group, about 4 OPr and 41 OEt units; amine number=25 mg KOH/g, manufacturer: Huntsman) and 8.5 g of dimethylaminopropylamine (0.08 mol) at 140° C. for 7 h.

Amine number: 40.1 mg KOH/g
Epoxy equivalent: infinite

Polymer 6

41 g (0.11 mol) of Epikote 828 and 25.3 g of hexamethylene diglycidyl ether (0.11 mol) are reacted with 359 g of Surfonamine L 207 (0.177 mol) and 8.5 g of dimethylaminopropylamine (0.08 mol) at 140° C. for 7 h.

Amine number: 39.2 mg KOH/g
Epoxy equivalent: infinite

Polymer 7

449.5 g of polymer 4 are reacted with 9 g of benzoyl chloride (0.08 mol) in 305 g of water at 100° C. for 4 h.

Amine number: 13.4 mg KOH/g

Polymer 8

449.5 g of polymer 4 are reacted with 9.8 g of benzoic acid at 50° C. for 4 h.

Amine number: 40.0 mg KOH/g
Acid number: 19.8 mg KOH/g

Polymer 9

82 g of Epikote 828 (0.22 mol) are reacted with 359 g of Surfonamine L 207 (0.177 mol), 6.4 g of dimethylaminopropylamine (0.06 mol) and 2.6 g of dibutylamine (0.02 mol) at 140° C. for 7 h.

Amine number: 39.1 mg KOH/g
Epoxy equivalent: infinite

Performance Testing

Use of the polymers of the invention as wetting agents and dispersants for production of pigment concentrates and use thereof in paint systems.

Starting Materials

| | |
|---|---|
| BYK-011 | silicone-free defoamer from BYK-Chemie |
| AMP 95 | 2-amino-2-methyl-1-propanol from Angus Chemicals |
| Setalux 6801 AQ-24 | aqueous acrylate binder from Nuplex Resins |
| Setalux 6802 AQ-24 | aqueous acrylate binder from Nuplex Resins |
| BYK-347 | silicone-containing surface additive from BYK-Chemie |
| BYK-348 | silicone-containing surface additive from BYK-Chemie |
| BYK-425 | rheology control agent from BYK-Chemie |
| PPG 600 | difunctional polypropylene glycol from BASF |
| FF99-0364 Pro Gloss topcoat | 2K polyurethane binder from BASF |
| Glossodur | isocyanate hardener from BASF |
| Carbon Black FW 200 | carbon black pigment from Orion |
| Carbon Black XPB 255 | carbon black pigment from Orion |
| Raven 5000 Ultra III | carbon black pigment from Birla Carbon |
| Heliogen blue L7101F | phthalocyanine pigment from BASF |
| Hostaperm Pink E | quinacridone pigment from Clariant |
| Laropal A 81 | aldehyde resin from BASF |
| Macrynal SM 510 | hydroxy-functional acrylate binder from Allnex |
| Shellsol A | aromatic hydrocarbon mixture from Shell |
| BYK-066N | silicone-containing defoamer from BYK-Chemie |
| BYK-306 | silicone-containing surface additive from BYK-Chemie |
| Desmodur N 3390 BA | aliphatic polyisocyanate from Bayer Material Science |
| Synthalat E405 | aldehyde resin from Synthopol |
| NC Chips E510 ESO | nitrocellulose from Dow Wolff Cellulosics |
| BYK-052 | silicone-free defoamer from BYK-Chemie |
| PMA | methoxypropyl acetate |

Production and Testing of Pigmented Aqueous Paints with Carbon Black Pigments

| Pigment concentrate | |
|---|---|
| Water | 64 |
| Wetting agent and dispersant | 10.5 |
| Byk-011 | 0.5 |
| AMP 95 | 10 |
| Pigment | 15 |
| | 100.00 |

The dispersion was effected with a Lau Paint Shaker DAS H[/A]200-K. The ratio of grinding material to glass beads (diameter 1 mm) was 1:2 (parts by weight), 300 min, cooling level 3, normal speed.

| Paint | |
|---|---|
| Setalux 6801 AQ-24 | 240 |
| Setalux 6802 AQ-24 | 450 |
| Byk-028 | 6 |
| Dimethylaminoethanol, 10% in water | 28 |
| Water | 255 |
| BYK-347 | 6 |
| BYK-348 | 5 |
| BYK-425/PPG600/water 2:1:7 | 10 |

(56) References Cited

FOREIGN PATENT DOCUMENTS

-continued

| Paint | |
|---|---|
| | 1000.00 |

| Letdown | |
|---|---|
| Pigment concentrate | 10 |
| Paint | 100 |
| | 110.00 |

The pigment concentrate is shaken with the paint for 5 min.

The pigmented letdown was applied to contrast card with a 120 μm spiral coating bar and the paint was flashed off and then subjected to intermediate drying at 80° C. for 15 min.

Subsequently, the FF99-0364 Pro Gloss topcoat, mixed 100:33 with the Glossodur hardener, was applied with a 120 μm spiral coating bar, flashed off and then subjected to through-drying at 100° C. for 15 min.

The viscosity measurements were conducted with the Stresstech instrument from Reologica Instruments AB. This was done using the CC 25 cylinder measurement system. The balancing time before the measurement commenced was 5 s. 12 measurement points were recorded at a shear rate of 100 1/s with a total measurement time of 48 s at a measurement temperature of 25° C. The viscosity value reported is the mean of the last 10 measurement points.

As a measure of the "jetness", the XYZ values were measured by means of a 45°/0° Color Guide with D65/10° illuminant. These are the converted to Mc, My and dM values by the following formula:

$$My = 100 \log\left[\frac{1}{Y}\right];$$

$$Mc = 100\left\{\log\left[\frac{Xn}{X}\right] - \log\left[\frac{Zn}{Z}\right] + \log\left[\frac{Yn}{Y}\right]\right\}; dM = Mc - My$$

Good jetness is identified by a high Mc value. In addition, a high blue level is desired, which is characterized by a high dM value.

Results for Carbon Black/Water

Carbon Black FW 200

| Wetting agent and dispersant | Viscosity immediate | Viscosity 7 d/40° C. | Mc | dM |
|---|---|---|---|---|
| Polymer 1 | 61 mPas | 62 mPas | 288 | 13 |
| Polymer 2 | 54 mPas | 70 mPas | 282 | 12 |
| Polymer 3 | 62 mPas | 68 mPas | 292 | 13 |
| Polymer 4 | 51 mPas | 61 mPas | 293 | 15 |

Carbon Black XPB 255

| Wetting agent and dispersant | Viscosity immediate | Viscosity 7 d/40° C. | Mc | dM |
|---|---|---|---|---|
| Polymer 1 | 51 mPas | 58 mPas | 308 | 19 |
| Polymer 2 | 65 mPas | 56 mPas | 316 | 20 |
| Polymer 3 | 48 mPas | 57 mPas | 209 | 14 |
| Polymer 4 | 40 mPas | 47 mPas | 318 | 22 |

Raven 5000 Ultra III

| Wetting agent and dispersant | Viscosity immediate | Viscosity 7 d/40° C. | Mc | dM |
|---|---|---|---|---|
| Polymer 1 | 38 mPas | 56 mPas | 318 | 22 |
| Polymer 2 | 41 mPas | 47 mPas | 324 | 22 |
| Polymer 3 | 31 mPas | 42 mPas | 322 | 20 |
| Polymer 4 | 31 mPas | 38 mPas | 327 | 22 |

For all three aqueous paints containing different carbon black pigments, it was shown that the polymer 4 of the invention gives the best jetness (highest value for Mc) and simultaneously a high blue level (highest value for dM).

Production and Testing of Pigmented Aqueous Paints with Organic Pigments

| Pigment concentrate | |
|---|---|
| Water | 62 |
| Wetting agent and dispersant | 7.5 |
| Byk-011 | 0.5 |
| Pigment | 30 |
| | 100.00 |

Dispersion with Lau Paint Shaker DAS H[/A]200-K: ratio of grinding material to glass beads (diameter 1 mm):1:2 (parts by weight), 300 min, cooling level 3, normal speed.

| Paint | |
|---|---|
| Setalux 6801 AQ-24 | 240 |
| Setalux 6802 AQ-24 | 450 |
| Byk-028 | 6 |
| Dimethylethanolamine, 10% in water | 28 |
| Water | 255 |
| BYK-347 | 6 |
| BYK-348 | 5 |
| BYK-425/PPG600/water 2:1:7 | 10 |
| | 1000.00 |

| Letdown | |
|---|---|
| Pigment concentrate | 10 |
| Paint | 100 |
| | 110.00 |

The pigment concentrate is shaken with the paint for 5 min.

The pigmented letdown is applied to a polyethylene film with a 50 μm spiral coating bar. The paint was flashed off and then dried at room temperature for 16 h.

Gloss measurement:

Instrument: Micro-TRI-Gloss, BYK Gardner

Angle: 20°

Number of measurements: n=3

Transparency is assessed visually: 1=good, 5=poor. Transparency is transmittance of light and, in the case of coatings which have been applied to transparent films, can be assessed via the visual sharpness of objects which are behind the film from the viewer's point of view.

Results for Organic Pigments/Water

Heliogen Blue L7101F

| Wetting agent and dispersant | Viscosity immediate | Viscosity 7 d/40° C. | Gloss 20° | Transparency |
|---|---|---|---|---|
| Polymer 1 | 68 mPas | 64 mPas | 55.1 | 1-2 |
| Polymer 2 | 68 mPas | 110 mPas | 53.8 | 1-2 |
| Polymer 3 | 64 mPas | 62 mPas | 37.3 | 3 |
| Polymer 4 | 55 mPas | 55 mPas | 56.6 | 1 |

Hostaperm Pink E

| Wetting agent and dispersant | Viscosity immediate | Viscosity 7 d/40° C. | Gloss 20° | Transparency |
|---|---|---|---|---|
| Polymer 1 | 122 mPas | 147 mPas | 43.7 | 1-2 |
| Polymer 2 | 65 mPas | 56 mPas | 43.6 | 2 |
| Polymer 3 | 411 mPas | 491 mPas | 45.6 | 3 |
| Polymer 4 | 263 mPas | 293 mPas | 46.1 | 1-2 |

Production and Testing of Pigmented Solventborne Paints with Carbon Black Pigments

| Pigment concentrate | |
|---|---|
| Laropal A 81 | 27.8 |
| PMA | 50 |
| Wetting agent and dispersant | 9.2 |
| Pigment | 13 |
| | 100.00 |

Dispersion with Lau Paint Shaker DAS H[/A]200-K: ratio of grinding material to glass beads (diameter 1 mm):1:2 (parts by weight), 300 min, cooling level 3, normal speed.

| Paint | |
|---|---|
| Macrynal SM 510 (70% in butyl acetate) | 750 |
| PMA | 50 |
| Shellsol A | 50 |
| Xylene | 66 |
| Butyl acetate | 80 |
| BYK-066N | 3 |
| BYK-306 | 1 |
| | 1000.00 |

| Hardener | |
|---|---|
| Desmodur N 3390 BA | 50 |
| Butyl acetate | 35 |
| Xylene | 10 |
| | 100.00 |

| Letdown | |
|---|---|
| Pigment concentrate | 6 |
| Paint | 20 |
| Hardener | 10 |
| | 36 |

The pigment concentrate is shaken with the paint and the hardener for 5 min.

The pigmented letdown is applied to contrast card with a 120 μm spiral coating bar. Drying: 16 h at room temperature.

Results for Carbon Black/Solvent

Carbon Black FW 200

| Wetting agent and dispersant | Viscosity immediate | Viscosity 7 d/40° C. | Mc | dM |
|---|---|---|---|---|
| Polymer 1 | 109 mPas | 183 mPas | 313 | 8 |
| Polymer 2 | 101 mPas | 156 mPas | 313 | 8 |
| Polymer 3 | 93 mPas | 157 mPas | 317 | 10 |
| Polymer 4 | 83 mPas | 156 mPas | 320 | 12 |

Carbon Black XPB 255

| Wetting agent and dispersant | Viscosity immediate | Viscosity 7 d/40° C. | Mc | dM |
|---|---|---|---|---|
| Polymer 1 | 75 mPas | 2500 mPas | 324 | 1 |
| Polymer 2 | 72 mPas | 10 200 mPas | 323 | 7 |
| Polymer 3 | 112 mPas | 23 400 mPas | 316 | 0 |
| Polymer 4 | 7 mPas | 86 mPas | 331 | 9 |

Raven 5000 Ultra III

| Wetting agent and dispersant | Viscosity immediate | Viscosity 7 d/40° C. | Mc | dM |
|---|---|---|---|---|
| Polymer 1 | 78 mPas | 131 mPas | 342 | 10 |
| Polymer 2 | 73 mPas | 7100 mPas | 329 | 7 |
| Polymer 3 | 70 mPas | 156 mPas | 323 | 7 |
| Polymer 4 | 65 mPas | 142 mPas | 352 | 12 |

For all three solvent-based paints containing different carbon black pigments, it was shown that the polymer 4 of the invention gives the best jetness (highest value for Mc) and simultaneously a high blue level (highest value for dM).

Production and Testing of Pigmented Solventborne Paints with Organic Pigments

| Pigment concentrate | |
|---|---|
| Laropal A 81 | 17 |
| PMA | 62.4 |

(56) References Cited

FOREIGN PATENT DOCUMENTS

-continued

| Pigment concentrate | |
|---|---|
| Wetting agent and dispersant | 5.4 |
| Pigment | 15.2 |
| | 100.00 |

Dispersion with Lau Paint Shaker DAS H[/A]200-K: ratio of grinding material to glass beads (diameter 1 mm):1:2 (parts by weight), 300 min, cooling level 3, normal speed.

| Paint | |
|---|---|
| Synthalat E405, 60% in xylene | 260 |
| NC Chips E510 ESO | 120 |
| Ethyl acetate | 196 |
| Xylene | 185 |
| Butyl acetate | 236 |
| BYK-052 | 2 |
| BYK-306 | 1 |
| | 1000.00 |

| Letdown | |
|---|---|
| Pigment concentrate | 25 |
| Paint | 100 |
| | 125.00 |

The pigment concentrate is shaken with the paint for 5 min.

The pigmented letdown is applied to a polyethylene film with a 50 μm spiral coating bar. Drying: 16 h at room temperature.

Results for Organic Pigments/Solvents

Heliogen Blue L7101F

| Wetting agent and dispersant | Viscosity immediate | Viscosity 7 d/40° C. | Gloss 20° | Transparency |
|---|---|---|---|---|
| Polymer 1 | 19 Pas | 11 Pas | 99.1 | 2 |
| Polymer 2 | 19 Pas | 11 Pas | 97.4 | 1 |
| Polymer 3 | 20 Pas | 14 Pas | 22.3 | 2 |
| Polymer 4 | 18 Pas | 11 Pas | 100.0 | 1 |

Hostaperm Pink E

| Wetting agent and dispersant | Viscosity immediate | Viscosity 7 d/40° C. | Gloss 20° | Transparency |
|---|---|---|---|---|
| Polymer 1 | 52 Pas | 36 Pas | 75.3 | 2 |
| Polymer 2 | 32 Pas | 29 Pas | 78.8 | 2 |
| Polymer 3 | 38 Pas | 41 Pas | 74.1 | 3 |
| Polymer 4 | 31 Pas | 24 Pas | 79.5 | 1 |

The invention claimed is:

1. A dispersion comprising at least one dispersion medium, at least one kind of dispersed particulate solid and at least one comb copolymer prepared from at least one diglycidyl ether (A) of the general formula (I)

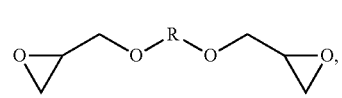

at least one polyether monoamine (B) of the general formula (II)

$$R'-[OEt]_n[OPr]_m[OBu]_s-NH_2 \quad (II),$$

at least one amine (C) of the general formula (III)

$$Z-R^1-NH_2 \quad (III),$$

and at least one secondary amine (D) which is free of primary amino groups and is of the general formula (IV)

$$NHTV \quad (IV)$$

where

R is a radical free of epoxy groups, selected from aliphatic radicals, aromatic radicals and araliphatic radicals, $R'$ is a radical selected from alkyl radicals having 1 to 6 carbon atoms, OEt is an ethylene oxide radical, OPr is a propylene oxide radical and OBu is a butylene oxide radical, n is a number from 0 to 100, m is a number from 3 to 50 and s is a number from 0 to 20 and n+m+s=3 to 103, $R^1$ is an aliphatic, aromatic or araliphatic hydrocarbyl radical having 1 to 12 carbon atoms, Z is a radical which is free of primary and secondary amino groups and has at least one basic nitrogen atom, T and V do not contain any secondary amino groups and are independently aliphatic radicals having 1 to 12 carbon atoms, aromatic radicals having 6 to 12 carbon atoms or araliphatic radicals having 7 to 12 carbon atoms, characterized in that the molar number of the sum total of the primary amino groups of the polyether monoamines (B) and primary amino groups of the amines (C), divided by the molar number of epoxy groups of the diglycidyl ethers (A), gives a value of ⅓ to ¾.

2. The dispersion as claimed in claim 1, wherein the comb copolymers are present in an amount of 0.1% to 10% by weight, based on the total weight of the dispersion.

3. The dispersion as claimed in claim 1, characterized in that the dispersion is an ink or a coating composition.

4. A particulate solid, characterized in that it has been coated with a comb copolymer prepared from at least one diglycidyl ether (A) of the general formula (I)

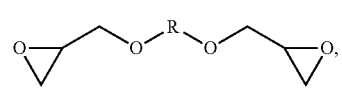

at least one polyether monoamine (B) of the general formula (II)

$$R'-[OEt]_n[OPr]_m[OBu]_s-NH_2 \quad (II),$$

at least one amine (C) of the general formula (III)

$$Z-R^1-NH_2 \quad (III)$$

and at least one secondary amine (D) which is free of primary amino groups and is of the general formula (IV)

NHTV  (IV)

where

R is a radical free of epoxy groups, selected from aliphatic radicals, aromatic radicals and araliphatic radicals, R' is a radical selected from alkyl radicals having 1 to 6 carbon atoms, OEt is an ethylene oxide radical, OPr is a propylene oxide radical and OBu is a butylene oxide radical, n is a number from 0 to 100, m is a number from 3 to 50 and s is a number from 0 to 20 and n+m+s=3 to 103, $R^1$ is an aliphatic, aromatic or araliphatic hydrocarbyl radical having 1 to 12 carbon atoms, Z is a radical which is free of primary and secondary amino groups and has at least one basic nitrogen atom, T and V do not contain any secondary amino groups and are independently aliphatic radicals having 1 to 12 carbon atoms, aromatic radicals having 6 to 12 carbon atoms or araliphatic radicals having 7 to 12 carbon atoms, characterized in that the molar number of the sum total of the primary amino groups of the polyether monoamines (B) and primary amino groups of the amines (C), divided by the molar number of epoxy groups of the diglycidyl ethers (A), gives a value of ⅓ to ¾.

5. A particle formulation containing 5.0% to 99.9% by weight of one or more particulate solids, characterized in that the formulation contains, based on the total weight of the particle formulation, 0.1% to 95.0% by weight of comb polymer prepared from at least one diglycidyl ether (A) of the general formula (I)

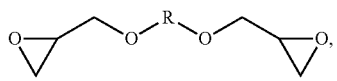  (I)

at least one polyether monoamine (B) of the general formula (II)

R'—[OEt]$_n$[OPr]$_m$[OBu]$_s$—NH$_2$  (II), at least one amine (C) of the general formula (III)

Z—$R^1$—NH$_2$  (III), and at least one secondary amine (D) which is free of primary amino groups and is of the general formula (IV)

NHTV  (IV)

where

R is a radical free of epoxy groups, selected from aliphatic radicals, aromatic radicals and araliphatic radicals, R' is a radical selected from alkyl radicals having 1 to 6 carbon atoms, OEt is an ethylene oxide radical, OPr is a propylene oxide radical and OBu is a butylene oxide radical, n is a number from 0 to 100, m is a number from 3 to 50 and s is a number from 0 to 20 and n+m+s=3 to 103, $R^1$ is an aliphatic, aromatic or araliphatic hydrocarbyl radical having 1 to 12 carbon atoms, Z is a radical which is free of primary and secondary amino groups and has at least one basic nitrogen atom, T and V do not contain any secondary amino groups and are independently aliphatic radicals having 1 to 12 carbon atoms, aromatic radicals having 6 to 12 carbon atoms or araliphatic radicals having 7 to 12 carbon atoms, characterized in that the molar number of the sum total of the primary amino groups of the polyether monoamines (B) and primary amino groups of the amines (C), divided by the molar number of epoxy groups of the diglycidyl ethers (A), gives a value of ⅓ to ¾.

6. The particle formulation as claimed in claim 5, comprising powder, chips, granules, color concentrates, pigment paste, full tone pastes, shading or tinting pastes or pigment pastes.

7. A dispersion comprising at least one dispersion medium, at least one kind of dispersed particulate solid and at least one comb copolymer exclusively prepared from, as components, at least one diglycidyl ether (A) of the general formula (I)

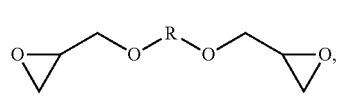  (I)

at least one polyether monoamine (B) of the general formula (II)

R'—[OEt]$_n$[OPr]$_m$[OBu]$_s$—NH$_2$  (II), and at least one amine (C) of the general formula (III)

Z—$R^1$—NH$_2$  (III), where

R is a radical free of epoxy groups, selected from aliphatic radicals, aromatic radicals and araliphatic radicals, R' is a radical selected from alkyl radicals having 1 to 6 carbon atoms, OEt is an ethylene oxide radical, OPr is a propylene oxide radical and OBu is a butylene oxide radical, n is a number from 0 to 100, m is a number from 3 to 50 and s is a number from 0 to 20 and n+m+s=3 to 103, $R^1$ is an aliphatic, aromatic or araliphatic hydrocarbyl radical having 1 to 12 carbon atoms, Z is a radical which is free of primary and secondary amino groups and has at least one basic nitrogen atom, characterized in that the molar number of the sum total of the primary amino groups of the polyether monoamines (B) and primary amino groups of the amines (C), divided by the molar number of epoxy groups of the diglycidyl ethers (A), gives a value of greater than ½ to ¾.

8. The dispersion as claimed in claim 7, wherein the comb copolymers are present in an amount of 0.1% to 10% by weight, based on the total weight of the dispersion.

9. The dispersion as claimed in claim 7, characterized in that the dispersion is an ink or a coating composition.

(56) References Cited

FOREIGN PATENT DOCUMENTS

10. A particulate solid, characterized in that it has been coated with a comb copolymer exclusively prepared from, as components, at least one diglycidyl ether (A) of the general formula (I)

(I)

at least one polyether monoamine (B) of the general formula (II)

R'—[OEt]$_n$[OPr]$_m$[OBu]$_s$—NH$_2$ (II), and at least one amine (C) of the general formula (III)

Z—R$^1$—NH$_2$ (III), where
R is a radical free of epoxy groups, selected from aliphatic radicals, aromatic radicals and araliphatic radicals,
R' is a radical selected from alkyl radicals having 1 to 6 carbon atoms,
OEt is an ethylene oxide radical, OPr is a propylene oxide radical and OBu is a butylene oxide radical,
n is a number from 0 to 100, m is a number from 3 to 50 and s is a number from 0 to 20 and n+m+s=3 to 103,
R$^1$ is an aliphatic, aromatic or araliphatic hydrocarbyl radical having 1 to 12 carbon atoms,
Z is a radical which is free of primary and secondary amino groups and has at least one basic nitrogen atom,
the molar number of the sum total of the primary amino groups of the polyether monoamines (B) and primary amino groups of the amines (C), divided by the molar number of epoxy groups of the diglycidyl ethers (A), gives a value of greater than ½ to ¾.

11. A particle formulation containing 5.0% to 99.9% by weight of one or more particulate solids, characterized in that the formulation contains, based on the total weight of the particle formulation, 0.1% to 95.0% by weight of comb polymer exclusively prepared from, as components, at least one diglycidyl ether (A) of the general formula (I)

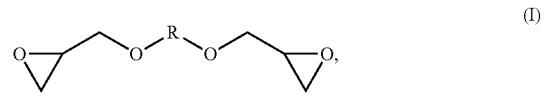
(I)

at least one polyether monoamine (B) of the general formula (II)

R'—[OEt]$_n$[OPr]$_m$[OBu]$_s$—NH$_2$ (II), and at least one amine (C) of the general formula (III)

Z—R$^1$—NH$_2$ (III), where
R is a radical free of epoxy groups, selected from aliphatic radicals, aromatic radicals and araliphatic radicals,
R' is a radical selected from alkyl radicals having 1 to 6 carbon atoms,
OEt is an ethylene oxide radical, OPr is a propylene oxide radical and OBu is a butylene oxide radical,
n is a number from 0 to 100, m is a number from 3 to 50 and s is a number from 0 to 20 and n+m+s=3 to 103,
R$^1$ is an aliphatic, aromatic or araliphatic hydrocarbyl radical having 1 to 12 carbon atoms,
Z is a radical which is free of primary and secondary amino groups and has at least one basic nitrogen atom,
the molar number of the sum total of the primary amino groups of the polyether monoamines (B) and primary amino groups of the amines (C), divided by the molar number of epoxy groups of the diglycidyl ethers (A), gives a value of greater than ½ to ¾.

12. The particle formulation as claimed in claim 11, comprising powder, chips, granules, color concentrates, pigment paste, full tone pastes, shading or tinting pastes or pigment pastes.

* * * * *